(12) United States Patent
Yu

(10) Patent No.: US 6,437,977 B1
(45) Date of Patent: Aug. 20, 2002

(54) SCREWLESS DISK DRIVE FRAME POSITIONING STRUCTURE

(75) Inventor: Chao-Hsuan Yu, Taoyuan (TW)

(73) Assignee: Lite-On Enclosure Inc., Taipei (TW)

( * ) Notice: Subject to any disclaimer, the term of this patent is extended or adjusted under 35 U.S.C. 154(b) by 187 days.

(21) Appl. No.: 09/631,823

(22) Filed: Aug. 3, 2000

(51) Int. Cl.[7] ................................. G05K 1/16
(52) U.S. Cl. .................. 361/685; 361/727; 312/223.2; 248/618
(58) Field of Search ............................ 361/685, 683, 361/724–727; 248/633, 634, 636, 638, 618; 312/332.1, 333, 223.1, 223.2

(56) References Cited

U.S. PATENT DOCUMENTS

| | | | |
|---|---|---|---|
| 4,979,909 A | * 12/1990 | Andrews | 312/333 |
| 5,768,099 A | * 6/1998 | Radloff et al. | 361/685 |
| 5,995,364 A | * 11/1999 | McAnally et al. | 361/685 |
| 6,227,632 B1 | * 5/2001 | Liu | 312/223.2 |
| 6,272,008 B1 | * 8/2001 | Huang | 316/685 |
| 6,297,952 B1 | * 10/2001 | Lui et al. | 361/685 |
| 6,317,318 B1 | * 11/2001 | Kim | 361/685 |

FOREIGN PATENT DOCUMENTS

JP         6-125184   * 10/1992  ............. G06F/1/16

* cited by examiner

Primary Examiner—Gerald Tolin
Assistant Examiner—Lisa Lea-Edmonds
(74) Attorney, Agent, or Firm—Rosenberg, Klein & Lee

(57) ABSTRACT

A screwless disk drive frame positioning structure is disclosed. A floppy disk drive frame is hanged below the hard disk drive frame, and then a positioning structure on the front plate of a computer base is used to buckle the disk drive frames, or after the hard disk drive frame is combined with the floppy disk drive frame, the hard disk drive frame is hanged from an upper plate of a computer base. Then, the positioning structure on the front plate of the computer base serves to buckle the floppy disk drive frame. The positioning structure comprises a pressure suffering plate and two elastic elements. A bending plate having a concave portion extends from the middle portion of the pressure suffering plate. While the floppy disk drive frame is a "⌐" shape plate. The lower side of the floppy disk drive frame is formed with a hooking plate folded outwards. By the upper grooves of the pressure suffering plate to buckle the hooking plate, the floppy disk drive frame/hard disk drive frame are fixed to the computer base without needing to any tool. Moreover, the attaching and detaching works can be performing rapidly.

5 Claims, 5 Drawing Sheets

SCREWLESS DISK DRIVE FRAME POSITIONING STRUCTURE

FIELD OF THE INVENTION

The present invention relates to a screwless disk drive frame positioning structure, which is designed for a computer base. By the present invention, the floppy disk drive frame/hard disk drive frame can be directly buckled to the computer base.

BACKGROUND OF THE INVENTION

The prior art floppy disk drive frame/hard disk drive frame is buckled to a computer base by screws. That is, the floppy disk drive frame/hard disk drive frame is directly screwedly fixed to a computer base. Since in this operation, screw opener is necessary in operation, the speed in assembly and maintenance is reduced, and the maintenance cost is therefore increased.

SUMMARY OF THE INVENTION

Accordingly, the primary object of the present invention is to provide screwless disk drive frame positioning structure. In the present invention, two banks of hooks are installed below the hard disk drive frame. The outer sides of each hook is installed with guide. Two banks of the sliding grooves are installed at the interior of the front plate of the computer base. A hook is installed above each sliding groove. Next, each hook is disposed with an elastic element. Another end of the elastic element is connected to two ends of a pressure suffering plate. The floppy disk drive frame has a "⌴" shape plate. One end surface of the floppy disk drive frame has two lateral sides with supporting plates folded outwards. The lower side of this end surface is suspended with a hooking plate folded outewards. The top of the floppy disk drive frame is suspended with a folding plate folded inwards. A plurality of hanging grooves are formed on the folded groove. The pressure suffering plate is extended with a bending plate having a concave portion. When the hanging grooves slide into the hooks, the two sides of the floppy disk drive frame will be confined. Now, when the pressure suffering plate is pulled down and the supporting plate is adhered to the front plate of the computer base. Further, the upper grooves of the pressure suffering plate are buckled to the hooking plate and the lateral sides of the pressure suffering plate are pushed into the sliding grooves of the front plate so that the front portion of the floppy disk drive frame is confined.

Therefore, by the present invention, the floppy disk drive frame/hard disk drive frame can be directly buckled to the computer base. This is the primary object of the present invention.

The various objects and advantages of the present invention will be more readily understood from the following detailed description when reading in conjunction with the appended drawing.

DETAILED DESCRIPTION OF THE PREFERRED EMBODIMENTS

The detail of the present invention will be described in the following with the appended figures. However, the embodiments and figures in the specification are used to make those skilled in the art to understand the present invention, while not to confine the scope and spirit of the present invention.

Figure 1:
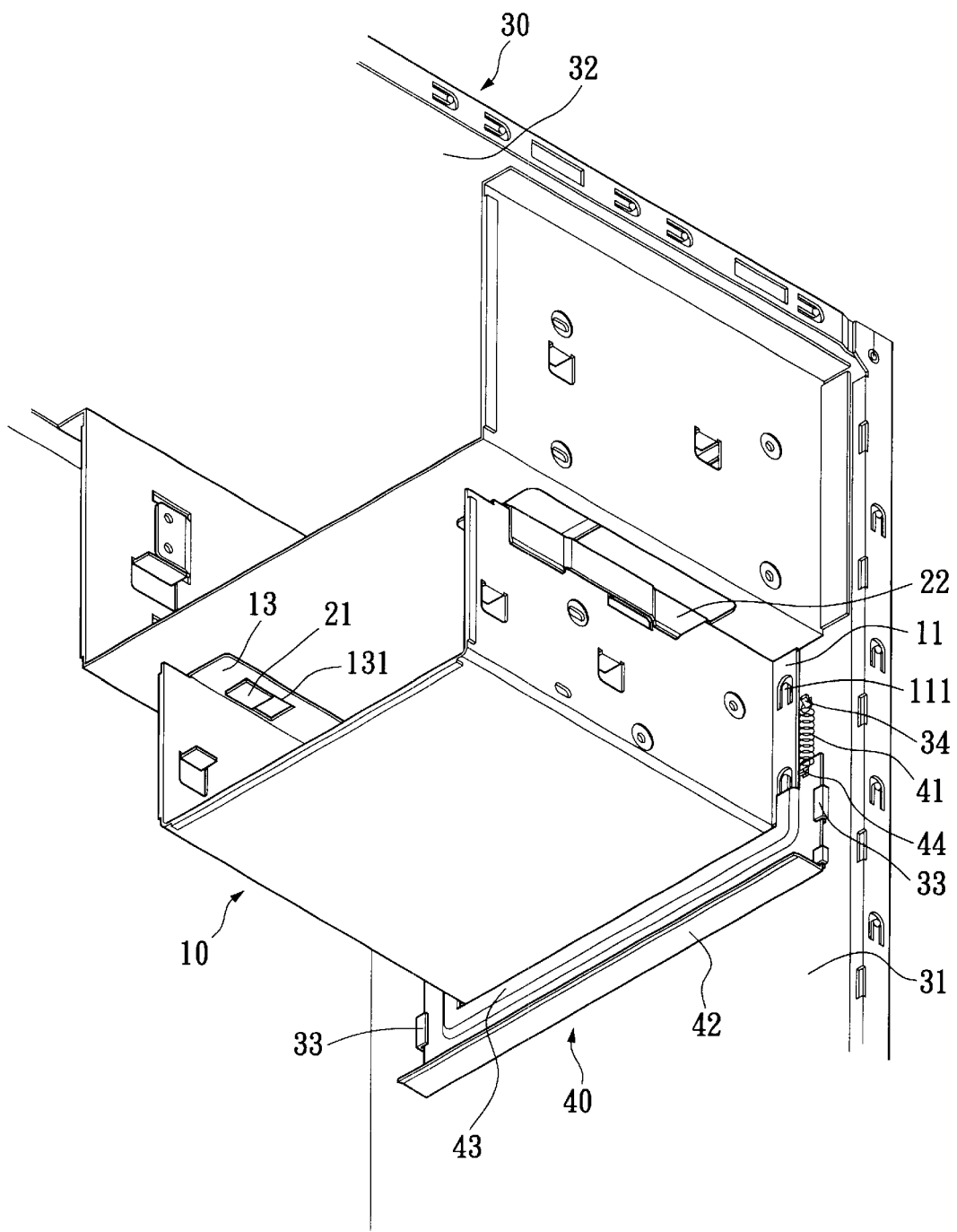
FIG. 1 is a perspective view of the screwless disk drive frame positioning structure in the present invention.
Figure 3:
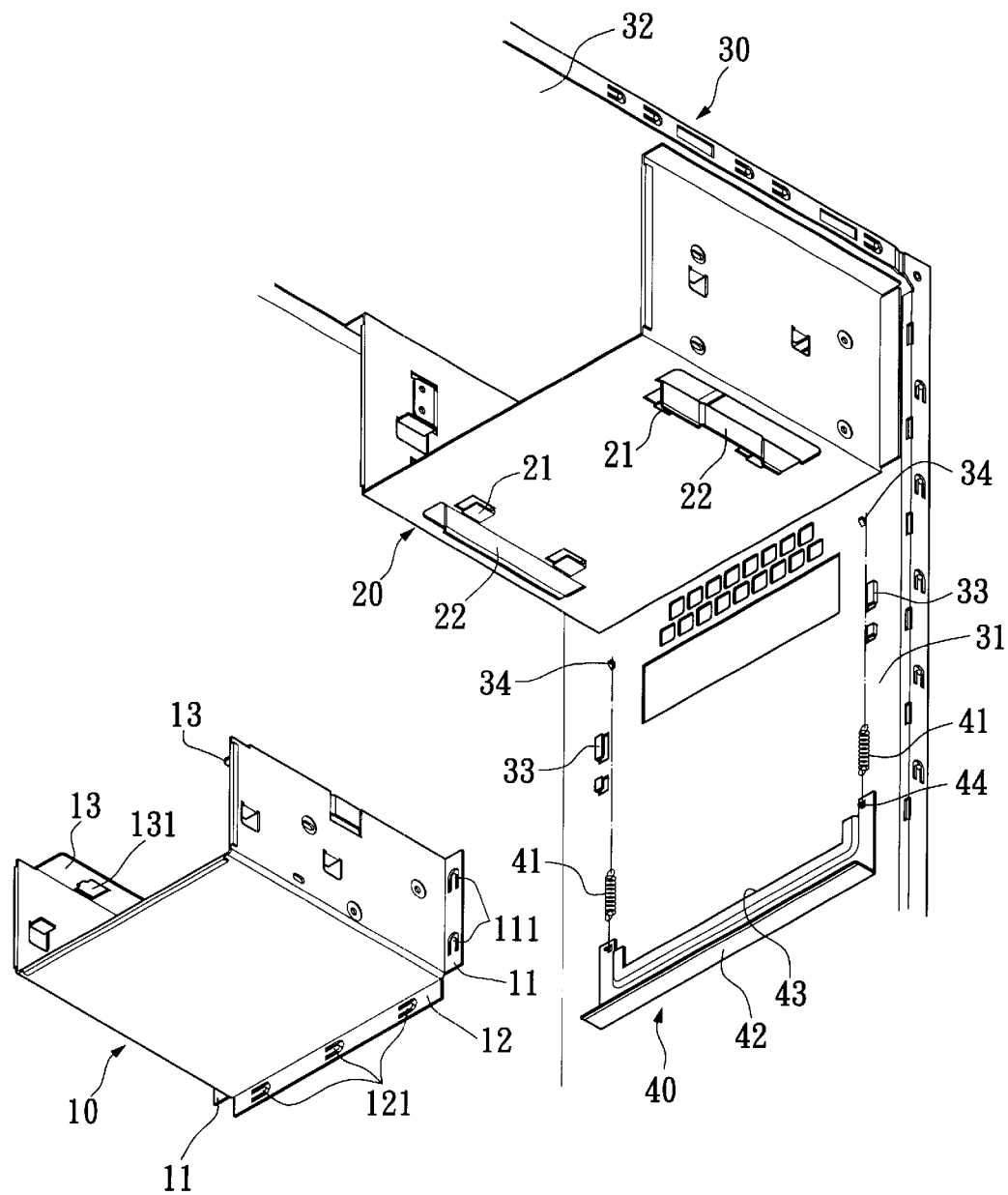
FIG. 3 is a perspective view showing the assembly of the screwless disk drive frame positioning structure in the present invention.

Referring to FIGS. 1 and 3, the structural perspective view, and exploded perspective view of the present invention are illustrated. In the screwless disk drive frame positioning structure of the present invention, a floppy disk drive frame 10 is hooked below the hard disk drive frame 20, and then a positioning structure 40 installed in the front plate 31 of a computer base 30 is used to buckle the structure. The upper plate 32 of the computer base 30 is fixed with the hard disk drive frame 20. The lower side of the hard disk drive frame 20 is installed two banks of hooks 21. Moreover, the outer sides of the hooks 21 are installed with guides 22 for confining the leftwards or rearwards movement of the floppy disk drive frame 10. Two banks of sliding grooves 33 are installed within the front plate 31 of the computer base 30. Each bank of the sliding grooves is hooked by a hook 34. A positioning structure 40 is formed in the hook. The floppy disk drive frame is a "⌴" shape plate. Two sides of one surface of the floppy disk drive frame 10 are suspended with respective supporting plates 11, and the bottom of this surface is suspended with a hooking plate 12 folded outwards. Further, the top of the floppy disk drive frame 10 is suspended with folding plates 13 folded inwards. A plurality of hanging grooves 131 are installed on the folding plate 13. The positioning structure 40 includes two elastic elements 41 and a pressure suffering plate 42. The upper side of the pressure suffering plate 42 is installed with a plate having a concave portion 43. The pressure suffering plate 42 has two sides having hooks 44. Each elastic element 41 is a spring. Two ends of the elastic element 41 are connected to the hooks 44 and 34 of the pressure suffering plate 42 and the front plate 31. Furthermore, a plurality of protruding elastomers 111 and 121 are installed on the supporting plate 11 and hooking plate 12 of the floppy disk drive frame 10.

Referring to FIG. 3, a perspective view showing the assembly of the screwless disk drive frame positioning structure in the present invention is illustrated. As shown in the figure, the pressure suffering plate 42 is pulled downwards firstly, the hanging grooves 131 of the floppy disk drive frame 10 slides into the hooks 21 of the hard disk drive frame 20. Then, the floppy disk drive frame 10 is pushed toward the front plate 31 so that the supporting plate 11 adhered to the front plate 31 of the computer base 30. Then, the upper concave portion 43 of the pressure suffering plate 42 will hook the hooking plate 12 so that the lateral sides of the pressure suffering plate 42 can be pushed into the sliding grooves 33 of the front plate 31 (see FIG. 1). By the restoring force of the elastic element 41, the position of the pressure suffering plate 42 is retained. Thus, the front portion of the floppy disk drive frame 10 is confined. Then, by the protruding elastomers 111 and 121, the supporting plate 11, hooking plate 12, and folding plate 31 of the floppy disk drive frame 10 are adhered more steadily without vibration. When detaching, the operation is performed in a reverse order.

Figure 4:
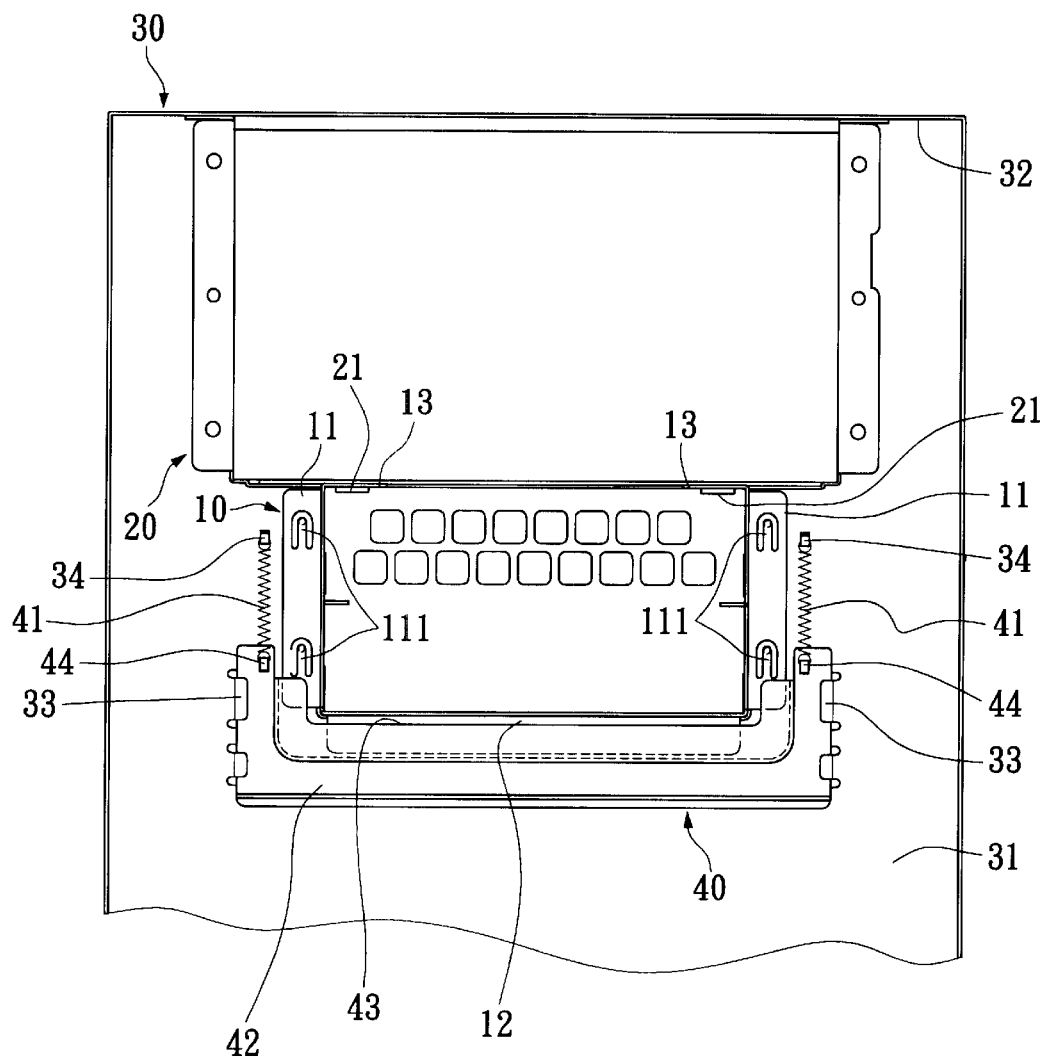
FIG. 4 is a rear view showing that an assembled screwless disk drive frame positioning structure of the present invention.

Referring to FIG. 4, the rear view showing an assembled screwless disk drive frame positioning structure of the present invention is illustrated. In the figure, it is disclosed that the concave portion 43 of the pressure suffering plate 42 can buckle the hook 12 of the floppy disk drive frame 10 and part of the supporting plate 12. By the restoring force of the elastic element 41, the pressure suffering plate 42 within the sliding groove 33 can be pulled upwards tightly. Therefore, in transferring, the floppy disk drive frame 10 will not separate from the computer base 30.

Figure 2:
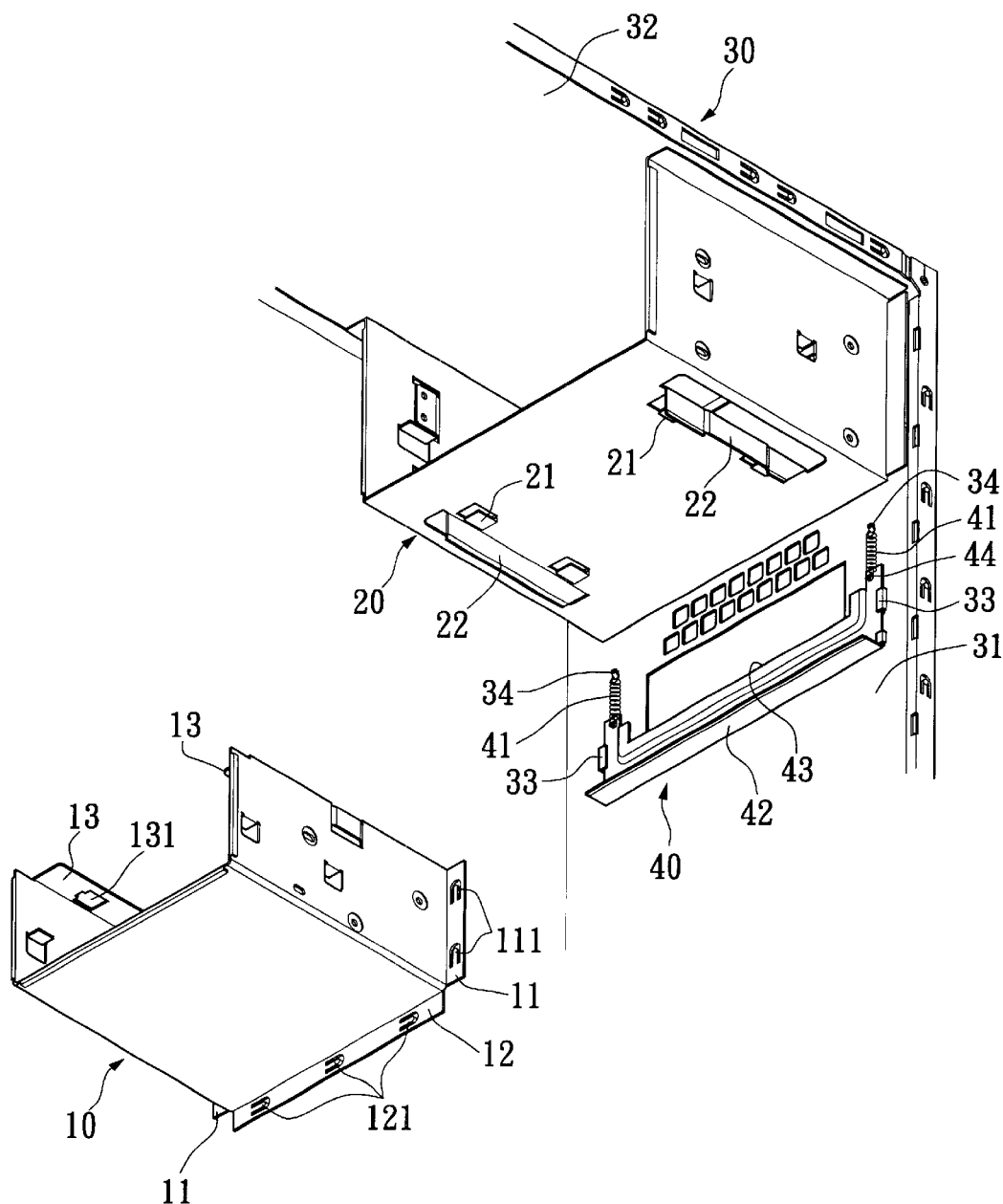
FIG. 2 is an exploded perspective view of the screwless disk drive frame positioning structure in the present invention.
Figure 5:
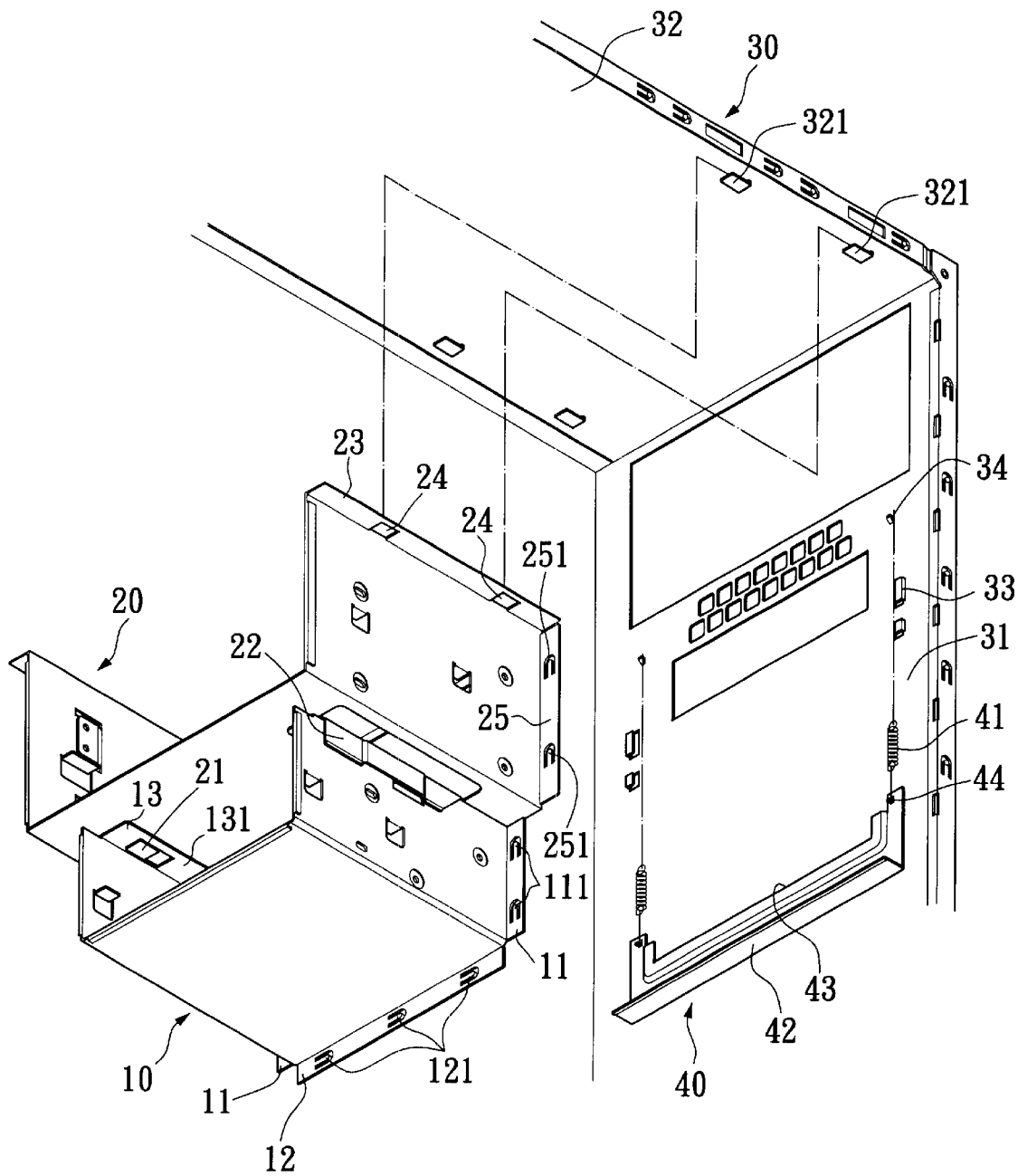
FIG. 5 is a partial exploded perspective view showing an assembled screwless disk drive frame positioning structure of the present invention.

With reference to FIG. 5, a partial exploded perspective view showing an assembled screwless disk drive frame positioning structure of the present invention is illustrated. The differences of the embodiment shown in FIG. 5 from that shown in FIG. 2 are that two banks of hooks 321 are added below the upper plate 32 of the computer base 30; and furthermore, the folding plate 23 at the top of the hard disk drive frame 20 is installed with a plurality of hanging grooves 24. The hanging grooves 24 of the hard disk drive frame 20 may slide into the hooks 321 of the computer base 30. Next, it should be appreciated that in the screwless disk drive frame positioning structure, after assembling the floppy disk drive frame 10 and hard disk drive frame 20, the hard disk drive frame 20 is hooked to the upper plate 32 of the computer base 30, and then the positioning structure 40 installed in the front plate 31 of the computer base 30 serves to fix the combination. The hard disk drive frame 20 is a ⌴ shape plate. Two sides of one surface of the hard disk drive frame 20 are suspended with respective supporting plates 25, and the top surface of the hard disk drive frame 20 is suspended with a hooking plate 23 folded outwards. A plurality of hanging grooves 24 are installed on the folding plates 23. Furthermore, the lower side of the hard disk drive frame 20 is installed with two banks of hooks 21. The outer side of the hook 21 is formed with a guide 22. If a protruding elastomer 251 is added to the supporting plate 25 of the hard disk drive frame 20, then the protruding elastomer 251 will cause the supporting plate 25 of the hard disk drive frame 20 to be more steadily adhered to the front plate 31 of the supporting plate 25 without vibration. Then, the hanging grooves 24 of the hard disk drive frame 20 slides into the hooks 321 of the computer base 30, and other assembling operations are identical to that shown in FIG. 3. Thus, the detail will not be further described herein.

The aforesaid floppy disk drive frame and hard disk drive frame can be viewed as one disk drive frame. That is, the disk drive frame has the features of having an end surface with two sides being installed with supporting plates, and having a lower side with a hooking plate so that after the disk drive frame slides into the hooks of the computer base, by the positioning structure, the hooking plate and the supporting plate can be buckled. Next, the supporting plate and folding plate may be folded inwards or outwards, this is not confined in the present invention. It is only needed that the hanging grooves of the folding plate is capable of hooking the hooks and the supporting plate and hooking plate are contact uniformly.

In summary, by the screwless disk drive frame positioning structure of the present invention, a hard disk drive frame or floppy disk drive frame can be installed in the computer base without needing any tools. Moreover, the positioning structure installed in the front plate serves to buckle the floppy disk drive frame. Therefore, the present invention is a novel invention met the requirement of inventive step.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A screwless disk drive frame positioning structure, wherein a disk drive frame is installed in a computer base; characterized in that:

two banks of sliding grooves are formed on an inner side of a front plate of the computer base; and a positioning structure is installed in the sliding grooves; an upper plate of the computer base is installed with two banks of hooks;

two lateral sides of one end surface of the disk drive frame are suspended with respective supporting plates and the lower side thereof is installed with a hooking plate; further, each side of a top surface of the disk drive frame is suspended with a folding plate, respectively; and a plurality of hanging grooves are formed on the folding plate;

wherein after the sliding grooves of the disk drive frame slide into the hooks of the computer base; the positioning structure serves to buckle the hooking plate and the supporting plates.

2. The screwless disk drive frame positioning structure as claimed in claim 1, wherein the positioning structure includes a pressure suffering plate and two elastic elements, the pressure suffering plate has a bending plate having a concave portion, and two ends of the elastic element are connected to two lateral sides of the pressure suffering plate and the front plate.

3. The screwless disk drive frame positioning structure as claimed in claim 1, wherein the disk drive frame includes hard disk drive frames and floppy disk drive frames.

4. The screwless disk drive frame positioning structure as claimed in claim 1, wherein each supporting plate has a plurality of protruding elastomers, thereby, the supporting plates of the disk drive frame is more steadily adhered to the front plate.

5. The screwless disk drive frame positioning structure as claimed in claim 1, wherein each hooking plate is formed with a plurality of protruding elastomers, so that the supporting plates of the disk drive frame is more steadily adhered to the front plate.

* * * * *